United States Patent [19]

Agazzi et al.

[11] Patent Number: 5,787,198
[45] Date of Patent: Jul. 28, 1998

[54] TEXT RECOGNITION USING TWO-DIMENSIONAL STOCHASTIC MODELS

[75] Inventors: Oscar Ernesto Agazzi, Florham Park; Shyh-Shiaw Kuo, Berkeley Heights, both of N.J.

[73] Assignee: Lucent Technologies Inc., Murray Hill, N.J.

[21] Appl. No.: 329,047

[22] Filed: Oct. 25, 1994

Related U.S. Application Data

[63] Continuation of Ser. No. 981,028, Nov. 24, 1992, abandoned.

[51] Int. Cl.$^6$ .............................. G06K 9/50; G06K 9/62
[52] U.S. Cl. .............................. 382/196; 382/228
[58] Field of Search ........................ 382/10, 20, 22, 382/30, 36, 39

[56] References Cited

U.S. PATENT DOCUMENTS

| 4,155,072 | 5/1979 | Kawa | 382/36 |
| 4,227,177 | 10/1980 | Moshier | 382/39 |

(List continued on next page.)

OTHER PUBLICATIONS

J. Wilpon, et al., "Automatic Recognition of Key words in Unconstrained Speech Using Hidden Markov Models", IEEE Trans. Acoust. Speech Signal Processing, vol. 38, pp. 1870–1878, Nov. 1990.

E. Levin and R. Pieraccini, "Dynamic Planar Warping for Optical Character Recognition", IEEE, ICASSP'92, vol. 3, pp. 149–152.

H. Baird, "Global-to-local layout Analysis", Proc. of the IAPR Workshop on Syntactic and Structural Pattern Recognition, France, Sep. 1988.

S. Srihari and G. Zack, "Document Image Analysis", Proc. of the 8th Int. Conf. on Pattern Recognition, Paris, Oct, 1986.

T. Pavlidis, "A Vectorizer and Feature Extractor for Document Recognition" Computer Vision, Graphics and Image Processing, vol. 35, pp. 11–127, 1986.

L. Rabiner, "A Tutorial on Hidden Markov Models and Selected Applications in Speech Recognition", Proc. of the IEEE, vol. 77, pp. 257–286, Feb. 1989.

L. Rabiner, et al., "A Segmental k-Means Training Procedure for Connected Word Recognition Based on Whole Word Reference Patterns", AT&T Tech. J., vol. 65, pp. 21–36, May 1986.

C. Bose and S. Kuo, "Connected and Degraded Text Recognition Using Hidden Markov Model", Proc. of the 11th Int. Conf. on Pattern Recognition, 1992.

*Primary Examiner*—Leo H. Boudreau
*Assistant Examiner*—Gerard Del Rosso
*Attorney, Agent, or Firm*—Geoffrey D. Greene

[57] ABSTRACT

Pseudo two-dimensional hidden Markov models (HMMs) are used to represent text elements, such as characters or words. Observation vectors for each text element are based on pixel maps obtained by optical scanning. A character is represented by a pseudo two-dimensional HMM having a number of superstates, with each superstate having at least one state. Text elements are compared with such models by using the Viterbi algorithm, first in connection with the states in each superstate, then the superstates themselves, to calculate the probability that a particular model represents the text element. Parameters for the models are generated by training routines. Probabilities can be adjusted to compensate for changes in scale, translations, slant, and rotation.

An embodiment is also disclosed for identifying keywords in a body of text. A first pseudo two-dimensional HMM is created for the words that may appear in the text. Each word in the text is compared with both models, again using the Viterbi algorithm, to calculate probabilities that the model represents the subject word. If the probability for the keyword is greater than that for the extraneous words, the subject word is identified as being the keyword. Preprocessing steps for reducing the number of words to be compared can be added.

17 Claims, 3 Drawing Sheets

U.S. PATENT DOCUMENTS

| | | | |
|---|---|---|---|
| 4,754,489 | 6/1988 | Bokser | 382/37 |
| 4,783,804 | 11/1988 | Juang et al. | 395/2 |
| 4,805,225 | 2/1989 | Clark | 382/39 |
| 4,977,599 | 12/1990 | Bahl et al. | 395/2 |
| 5,020,112 | 5/1991 | Chou | 382/39 |
| 5,105,470 | 4/1992 | Will | 382/39 |
| 5,199,077 | 3/1993 | Wilcox et al. | 381/42 |
| 5,321,773 | 6/1994 | Kopec et al. | 382/209 |
| 5,438,630 | 8/1995 | Chen et al. | 382/196 |

TEXT RECOGNITION USING TWO-DIMENSIONAL STOCHASTIC MODELS

This application is a continuation of application Ser. No. 07/981,028, filed on Nov. 24, 1992, now abandoned.

TECHNICAL FIELD

This invention relates to optical text recognition and more specifically to robust methods of recognizing characters or words regardless of impediments such as font differences or poor document reproduction.

BACKGROUND OF THE INVENTION

Stochastic models, such as hidden Markov models (HMMs), together with dynamic programming techniques, have been widely used in the field of speech recognition. For example, see the article entitled "Automatic Recognition of Keywords in Unconstrained Speech Using Hidden Markov Models" by J. Wilpon, L. Rabiner, C. Lee and E. Goldman, IEEE Trans. Acoust. Speech Signal Processing, Vol. 38, pp. 1870–1878, November 1990. It has also been realized that many problems in speech recognition have their counterparts in optical text recognition. Thus, stochastic modeling and dynamic programming have also been employed for this purpose. For example, see the article entitled "Connected and Degraded Text Recognition Using Hidden Markov Model" by C. Bose and S. Kuo, Proc. of the 11th Int. Conf on Pattern Recognition, 1992 and application Ser. No. 07/813,225, filed Dec. 23, 1991.

Optical recognition of text is often hampered by the use of multiple fonts or different character sizes, blurred documents, distorted characters and other impediments. Accordingly, it is desirable to improve recognition methods to be robust regardless of such impediments.

SUMMARY OF THE INVENTION

In accordance with the invention, pseudo two-dimensional hidden Markov models are used to represent text elements, such as characters or words. Observation vectors for each text element are based on pixel maps obtained by optical scanning. A character is represented by a pseudo two-dimensional HMM having a number of superstates, with each superstate having at least one state. In a preferred embodiment, the superstates represent horizontal slices through the text element.

Text elements are compared with such models by using the Viterbi algorithm, first in connection with the states in each superstate, then the superstates themselves, to calculate the probability that a particular model represents the text element. Parameters for the models are generated by training routines. Embodiments are also disclosed having greater tolerance to deterministic image transformations relating to such factors as scale, translation, slant, and rotation.

A further embodiment is disclosed for identifying keywords in a body of text. A first pseudo two dimensional HMM is created for the keyword and a second such model is created for all other extraneous words that may appear in the text. Each word in the text is compared with both models, again using the Viterbi algorithm, to calculate probabilities that the model represents the subject word. If the probability for the keyword is greater than that for the extraneous words, the subject word is identified as being the keyword. Preprocessing steps for reducing the number of words to be compared are also disclosed.

These and other aspects of the invention will become apparent from the drawings and detailed description.

DETAILED DESCRIPTION

Text elements, such as characters or words, to be recognized in accordance with the invention will typically be part of a larger body of textual and graphical material on a page. For the purposes of describing the invention, it will be assumed that the page has been optically scanned and that a text element to be recognized has been captured as a sequence of pixels generated by a conventional raster scan of the text element. Many techniques for performing such operations are well known to those skilled in the art. For example, see the articles "Global-to-local layout analysis" by H. Baird in the Proceedings of the IAPR Workshop on Syntactic and Structural Pattern Recognition, France, September 1988 and "Document Image Analysis" by S. Srihari and G. Zack in the Proceedings of the 8th International Conference on Pattern Recognition, Paris, October 1986.

Such pixel sequences for known text elements are used to "train" HMMs representing such elements. As will be explained in more detail below, the pixel sequence for an unknown text element is then compared with the model to determine the probability that the model represents such unknown text element.

Figure 1:
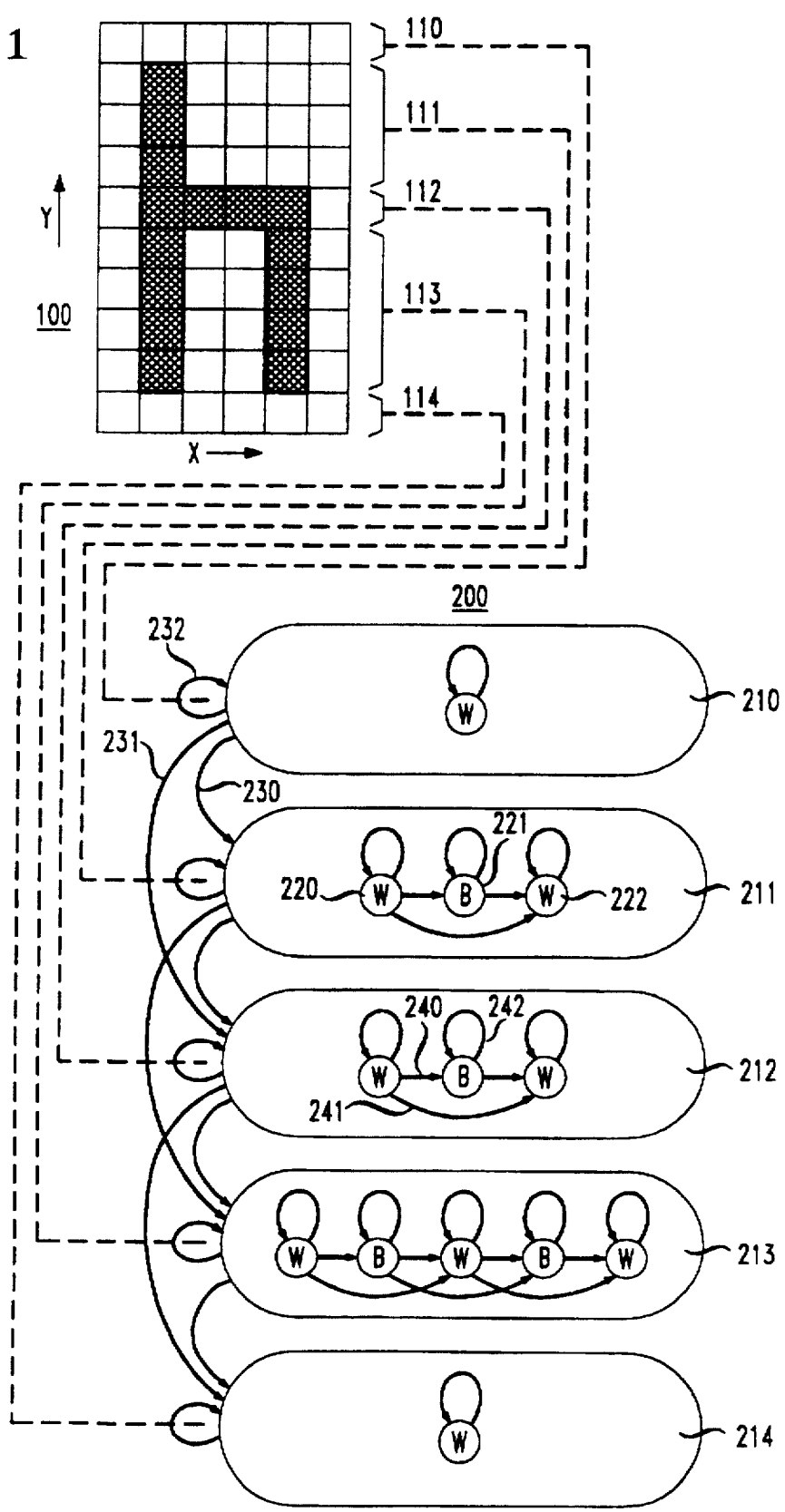
FIG. 1 shows a pixel map of a character together with a corresponding state diagram for a pseudo two-dimensional HMM.

FIG. 1 shows a pixel map 100 of the character "h" together with a corresponding state diagram 200 for a pseudo two-dimensional HMM for such character, in accordance with the invention. The model is termed a "top-down, left-right" model because it depicts the sequence of states resulting from a conventional raster scan of the pixel map. It is called a "pseudo" two-dimensional model because it is not ergodic—that is, it is not a fully-connected two-dimensional network.

Five "superstates" 210–214 are shown in state diagram 200. Such superstates correspond respectively to the five horizontal regions 110–114 in pixel map 100. Note that all the rows of pixels in a given one of regions 110–114 are the same. Within each superstate 210–214, the various horizontal "states" possible in the rows of the corresponding region in the pixel map are shown. For example, superstate 211 includes three states 220–222 representing the white, black and white pixels respectively in the rows of region 111.

Permitted transitions between superstates are denoted by arrows such as 230 and 231. Arrows such as 232 indicate that a transition can occur from a superstate to itself. Similarly, transitions between states are denoted by arrows such as 240 and 241 and transitions to the same state by arrows such as 242.

An alternative to the structure of the model represented by state diagram 200 is a model using superstates representing vertical slices. However, typical printed characters usually consist of horizontal strokes and vertical or slanted strokes, depending on the font. For example, an "italic" font will have slanted strokes. Using superstates representing horizontal slices, it is possible to represent both fonts with the same models, except when the basic structure of the character differs from one font to the other. However, there are applications where superstates representing vertical slices may be useful. One such application will be described below in conjunction with character rotations.

The sum of all the probabilities of transition from a state (or superstate) to another state (or superstate) or back to the same state (or superstate) must equal 1. For example, a transition probability is associated with each transition from superstate 210 indicated by arrows 230, 231 and 232. The sum of the transition probabilities from a state (or superstate) to another state (or superstate) is the reciprocal of the duration of the state (or superstate), measured in number of pixels. Thus, the length of a white or black horizontal segment in a raster scan of the pixel map is represented by the associated transition probability; a long segment corresponds to a state with low transition probability to the next state; a short segment corresponds to a state with high transition probability. The same principles also apply to superstates. In the absence of noise, the probability of observing a black pixel in a certain state will be 0 or 1, but noise causes the actual values to be different from such values.

The data structure used to represent a basic pseudo two-dimensional hidden Markov model consists of:
the number of superstates ($N_v$),
initial probabilities for the superstates ($\Pi_v$),
superstate transition probabilities ($A_v$),
and, for each superstate:
the number of states in the superstate ($N_h$),
initial probabilities for the states ($\Pi_h$),
state transition probabilities within the superstate ($A_h$),
observation probabilities for each state in the superstate ($B_h$).

As will be seen, such data structure can be augmented with data for the probability densities of state durations, such as the mean and standard deviation for a Gaussian distribution.

The observations for a text element are based on the pixels. The simplest kind of observation is binary, that is, whether the pixel is black or white. Other kinds of observations can include additional information, such as transition or position information. When such additional information is included, each observation can be a vector quantity representing several different components. An example of such an observation vector will be given below in conjunction with the explanation of keyword recognition.

The structure of a pseudo two-dimensional HMM encodes the topology of its associated character. There is a close correspondence between the graph representing the model, such as state diagram 200, and the line adjacency graph (LAG) for a character, such as is described in the article entitled "A Vectorizer and Feature Extractor for Document Recognition" by T. Pavlidis in Computer Vision, Graphics and Image Processing, Vol. 35, pp. 11–127, 1986. However, unlike the LAG, the transition probabilities in the HMM encode shape information. Also, features such as serifs, which can cause different fonts for the same character to have drastically different LAGs, can be conveniently represented in a single HMM having enough states and superstates to cover all the features by simply allowing some states or superstates to be skipped for characters not having such features.

Pseudo two-dimensional HMMs can be thought of as elastic templates because they allow for distortion in two dimensions, thus significantly increasing the robustness of the model. For example, vertical distortion, as often occurs in facsimile transmission, can be accommodated by the methods of the invention.

In the state diagram for a pseudo two-dimensional HMM, only left-to-right transitions between states are allowed (possibly skipping one state as indicated, for example, by arrow 241), and only top-to-bottom transitions between superstates are allowed (possibly skipping one superstate as indicated, for example, by arrow 231). Skipped states can occur when characters are blurred, or when different character fonts are used, as described above.

The Viterbi algorithm is a well-known dynamic programming method that can be used for calculating the probability that a particular HMM is a match for a given sequence of observations. Such algorithm is widely used in speech recognition, for example, see the article entitled "A Tutorial on Hidden Markov Models and Selected Applications in Speech Recognition" by L. Rabiner in Proceedings of the IEEE, Vol. 77, pp. 257–286, February 1989 and has also been used in text recognition, as described in application Ser. No. 07/813,225 mentioned above.

In using the Viterbi algorithm, the probability $\delta$ of being in each state of the HMM is calculated for each observation, resulting in an N×T array, usually called a "trellis," of probabilities, where N is the number of states and T is the number of observations in the sequence. The highest such probability P * after the last observation in the sequence is used as the "score" for the HMM in regard to the sequence of observations. The process of tracking the sequence of states to determine the best path through the model is known as segmentation. For some applications, an array of backpointers is also maintained so that the actual state sequence can be reconstructed for postprocessing steps, such as postprocessing to introduce state duration densities as will be described below.

The first step in the Viterbi algorithm is an initiation step wherein the initial probability $\delta_1$ is calculated for each state of the HMM as follows:

$$\delta_1(i)=\pi_i b_i(O_1), 1\leq i \leq N \tag{1}$$

where:
N=the number of states,
$\pi_i$=the probability of being in state i initially,
$b_i$=the probability of a given observation in state i, and
$O_1$=the actual initial observation;
and the backpointer array is initialized as follows:

$$\psi_1(i)=0. \tag{2}$$

Then, for each subsequent observation t, a new probability is calculated for each state j as follows:

$$\delta_t(j) = \max_{1\leq i\leq N} [\delta_{t-1}(i)a_{ij}]b_j(O_t), 2\leq t \leq T, 1\leq j \leq N \tag{3}$$

where:

T=the number of observations, and
$a_{ij}$=the transition probability from state i to state j;
and the backpointer array is updated as follows:

$$\psi_t(j) = \underset{1\leq i\leq N}{\text{argmax}} [\delta_{t-1}(i)a_{ij}], 2\leq t \leq T, 1\leq j \leq N \tag{4}$$

After all T observations have been accounted for, the final probability for the HMM can be chosen to be the maximum probability calculated after the last observation:

$$P^* = \max_{1 \leq i \leq N} [\delta_T(i)] \quad (5)$$

where the final state associated with P* is:

$$q_T^* = \underset{1 \leq i \leq N}{\operatorname{argmax}} [\delta_T(i)] \quad (6)$$

Typically, such state will be state N. However, cases are possible in which the maximum probability after the last observation is associated with a state other than state N. In some applications of HMMs, such as speech processing and character recognition, it is preferred in such cases to use the probability calculated for state N after the last observation as the probability for the HMM, not the maximum probability.

For pseudo two-dimensional HMMs, the Viterbi algorithm is used repeatedly for the superstates and the states within each superstate. Such HMMs are thus treated as nested one-dimensional models rather than truly two-dimensional.

Figure 2:
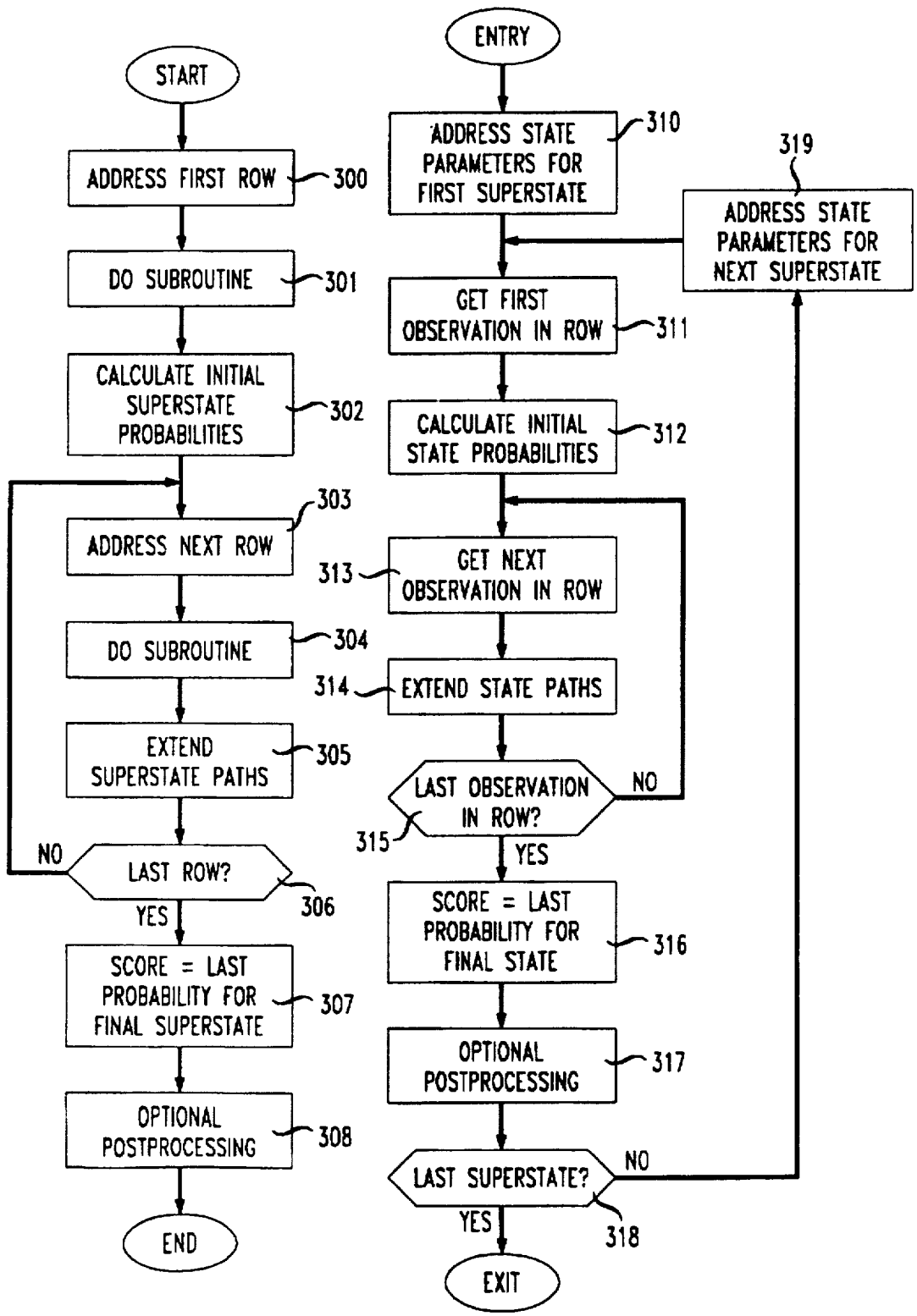
FIG. 2 is a flow chart showing the operation of a computer programmed to compare a pixel map for a text element with a pseudo two-dimensional HMM in accordance with the invention.

FIG. 2 is a flow chart showing the operation of a computer programmed to compare a pixel map for a text element, such as a character or word, with a pseudo two-dimensional HMM in accordance with the invention, in which the superstates represent horizontal slices. Steps 300–307 show the main routine, which uses the Viterbi algorithm to calculate the maximum probability for the text element from probabilities P* that a particular row of pixels belongs in a particular superstate. Steps 301 and 304 of the main routine each use a subroutine, shown in steps 310–318, that uses the Viterbi algorithm for each superstate to calculate such probabilities P* for each row. It is assumed that the observations making up the pixel map and the various parameters for the HMMs are stored in appropriate memory areas in the computer performing the calculations.

At the start of the main routine, the observations for the first row are addressed (step 300). Then the subroutine (steps 310–318) is performed using such observations. Upon entry into such subroutine, the HMM state parameters $N_h$, $\pi_h$, $A_h$ and $B_h$ for the first superstate are addressed (step 310), then the first observation in the current row is retrieved (step 311) and the initial state probabilities for the superstate are calculated (step 312) using the appropriate parameters $\pi_h$ and $B_h$ and equation (1). Then the next observation in the current row is retrieved (step 313) and the next set of state probabilities is calculated (step 314) using the appropriate parameters $N_h$, $A_h$ and $B_h$ and equation (3) to extend the best paths through the states. After the last observation in the row (step 315), the probability P* for such row and the current superstate is the last probability calculated for the final state in the row, not the maximum probability calculated after the last observation (step 316). However, as described above in conjunction with equations (5) and (6), the probability calculated for the final state after the last observation will typically be the maximum probability. An optional postprocessing step (step 317) is indicated, which can be used for various refinements to the method of the invention, as will be described below.

If there are still more superstates (step 318), the state parameters of the next superstate are addressed (step 319) and steps 311–318 are repeated for the current row and the next superstate. Thus, the subroutine returns a probability P* for the current row and each superstate.

Upon exit from the subroutine entered in step 301, the initial superstate probabilities are calculated from the HMM superstate parameters $\pi_v$ and $B_v$ and equation (1) using such returned probabilities P* for observations $O_1$ (step 302). Then the next row is addressed (step 303), the subroutine is repeated (step 304), and the best paths through the superstates are then extended by calculating the next set of superstate probabilities (step 305) using equation (3), the appropriate HMM parameters $N_h$, $A_h$ and $B_h$ and the probabilities P* returned by the subroutine for observations $O_r$. If there are still more rows (step 306), steps 303, 304 and 305 are repeated for the next row. Finally, after the last row, the ultimate likelihood score that the HMM represents the text element being compared is the last probability evaluated for the final superstate (step 307). Again, an optional postprocessing step (step 308) is indicated for refinements to be explained. It will be clear that the above-described method can also be used for HMMs in which the superstates represent vertical slices. In such cases, references to "rows" can be replaced with references to "columns".

Many of the calculations used in HMMs involve multiple calculations of products of probabilities. It is usually more convenient, and preferred, to convert such calculations to logarithmic form. Using logarithms for such calculations not only avoids problems with numerical precision but also simplifies products to sums while retaining the relative value relationships needed when comparing an unknown to various models to find the most suitable model.

Figure 3:
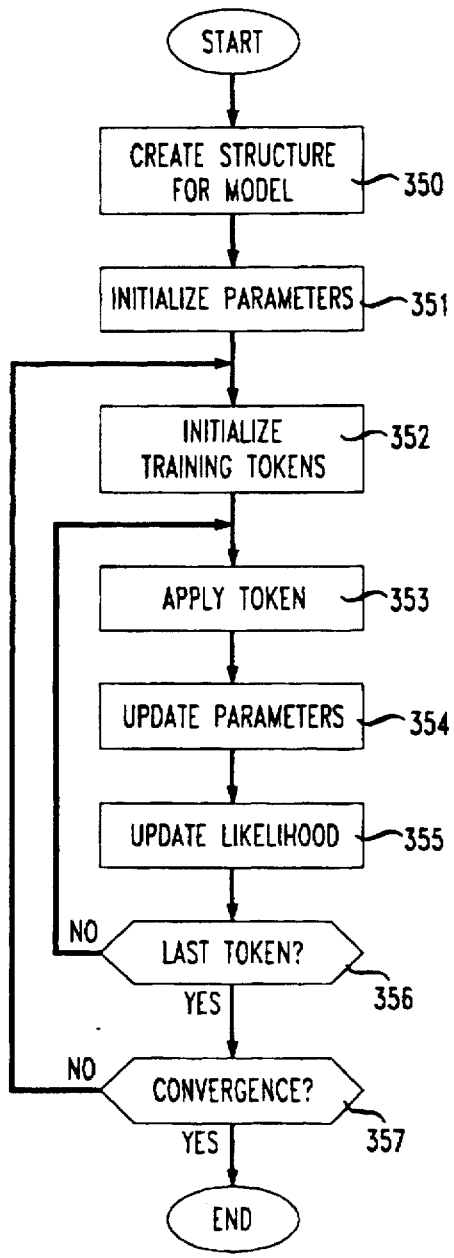
FIG. 3 is a flow chart showing the procedure for creating a pseudo two-dimensional HMM.

The parameters $\pi$, A and B can be estimated for a pseudo two-dimensional HMM by using the segmental k-means algorithm described below. Such algorithm is referred to in the article entitled "A Segmental k-Means Training Procedure for Connected Word Recognition Based on Whole Word Reference Patterns" by L. Rabiner, J. Wilpon and B. Juang, AT&T Tech J., Vol. 65, pp. 21–31, May 1986. FIG. 3 is a flow chart showing the use of the sequential k-means algorithm in creating a pseudo two-dimensional HMM. First, the structure of the model, that is, the number of superstates and states in each superstate, is determined (step 350). This can be accomplished by scanning a clearly-defined sample of the text element to be represented by the HMM to create a pixel map, counting the transitions in each row of the pixel map and grouping together adjacent rows having the same number of transitions and essentially the same numbers of black and white pixels. Each group then correspond to a superstate and the number of transitions in the rows in the group corresponds to one less than the number of states in the superstate. For example, referring again to pixel map 100 in FIG. 1, the three adjacent rows in region 111 each have two transitions and the same number of black and white pixels, corresponding to a superstate having three states. The row in region 112 also has two transitions, but with significantly different numbers of black and white pixels than the rows in region 111, so the row in region 112 forms its own superstate.

Next, the parameters for the model are initialized (step 351). This can be done arbitrarily or by using parameters derived from the sample used to create the structure. After the structure for the model is created and the parameters are initialized, the values of the parameters can be reestimated by "training" the model using representative samples of the text elements being modeled (tokens) in the form such elements are likely to take in the text to be recognized (step 352). An observation sequence (pixel map) is created for each token, and the Viterbi algorithm is then used for segmentation of the observation sequence with respect to the model (step 353). The parameters are then updated in accordance with histograms of the results of the segmentation (step 354). For example, the updated estimates of parameters $\pi_i$, $a_{ij}$ and $b_i$ would be:

$$\pi_i = \frac{\text{number of tokens starting from state } S_i}{\text{total number of tokens}} \quad (7)$$

$$a_{ij} = \frac{\text{number of transitions from state } S_i \text{ state } S_j}{\text{total number of transitions starting from state } S_i} \quad (8)$$

$$b_i(p) = \frac{\text{number of observations of } p \text{ in state } S_i}{\text{total number of observations}} \quad (9)$$

During reestimation, the Viterbi algorithm is used to calculate a likelihood for each token with respect to the model, and such likelihoods for all tokens are combined (probabilities are multiplied, log probabilities are added) to provide an overall likelihood of the effectiveness of the model with respect to the tokens (step 355). After all the tokens have been processed (step 356), if the parameters have converged, that is, such overall measure has reached essentially its maximum value, the training procedure is complete (step 357). If not, the training procedure is repeated. A typical method of determining convergence is to compare the overall likelihoods from step 355 for successive iterations. If the difference is small, indicating that the parameters have not changed significantly during the last iteration, then convergence can be assumed. For a two-dimensional HMM, the parameters $\Pi_h$, $A_v$ and $B_v$ for the superstates and the parameters $\Pi_h$, $A_h$ and $B_h$ for the states within the superstates can all be determined by this method.

Other methods known in the art can be used to estimate the parameters for HMMs; for example, the Baum-Welch reestimation formulas and the generalized probabilistic descent method.

In the above description, the "observation" for each pixel has been assumed to be a simple binary function, that is, black or white. In some applications of the invention, it is advantageous to associate additional information with each observation, with the various components, making up the observation forming an observation vector. A more specific example of such an observation vector will be described below in conjunction with keyword recognition.

In a conventional HMM, the probability of remaining in a state for a duration $d_i$ (the probability density) is an exponential function expressed as $$P(d_i) = a_{ii}^{(d-1)} a_{ij} \quad (10)$$

where $a_{ii}$ is the self-transition probability and $a_{ij}$ is the transition probability to the next state. However because the distribution of state durations in actual practice is not likely to result in an exponential probability density, significant improvement in performance can be achieved by introducing more elaborate state duration densities into the HMMS. Segmentation into states is first accomplished using the parameters $\Pi$, A and B as described above, then the scores calculated during segmentation are adjusted in a postprocessing step using the backpointers from array $\psi$ to retrieve parameters for a more appropriate probability density for each state in the best path. An example of such adjustment is to replace the self-transition probabilities for each state with Gaussian state duration probability densities.

For each state or superstate $q_i$, such adjustment can be accomplished as follows:

$$p(i) = \delta \left[ \frac{p_i}{d_{ii}^{[d(i)-1]}} \right] \left[ \frac{1}{\sqrt{2\pi}\,\sigma_i} e^{\frac{-[d(i)-d_0(i)]^2}{2\sigma^2}} \right] \quad (11)$$

where the first term in brackets cancels out the exponential probability density and the second term in brackets applies the Gaussian probability density. $a_{ii}$ is the self-transition probability, d(i) is the actual state duration in number of pixels and $d_0(i)$ is the mean and $\sigma_i$ the standard deviation of state durations. The value of d for a given state is determined from the array $\psi$ by counting the number of self-transitions in the state or superstate. The values of $d_0(i)$ and $\sigma_i$ can be established for each state or superstate during training as follows:

$$d_0(i) = \frac{1}{N} \sum_{k=1}^{N} [d_i(k)] \quad (12)$$

$$\sigma(i) = \sqrt{\frac{1}{N} \sum_{k=0}^{N-1} [d_i(k) - d_0(i)]^2} \quad (13)$$

where N is the number of entries into state $q_i$ and $d_i(k)$ is the duration of entry k.

Because a superstate can encompass more than one row of pixels and because each such row will follow a path through the states in such superstate, a given state can be entered more than once for a given token. Hence, when equations (12) and (13) are used for states, N can be greater than the number of tokens. However, a given superstate can only be entered once for each token. Accordingly, when such equations are used for superstates, N is equal to the number of tokens.

Since the final probability P * is the product of the probabilities for all states passed through, such adjustment can be performed repeatedly on P* using the mean and standard deviation for each state passed through in turn. If P* is expressed as a logarithm, the adjustment can be accomplished by converting the adjustments to logarithmic form, summing such logarithmic adjustments for each state passed through and then adding the total adjustment to logP*.

For two-dimensional HMMs, such adjustment is performed for the states in a superstate before the superstate segmentation is carried out and the adjusted state probabilities are then used in calculating the superstate probabilities. Then a corresponding adjustment is performed on the superstate probabilities. Referring to FIG. 2, such adjustment is carried out as part of optional postprocessing step 317 to adjust the best path through the states in a superstate and then as part of optional postprocessing step 308 to adjust the best path through the superstates.

The above procedure can be demonstrated more explicitly by the following equations:

$$p_x(y,i) = P_x(y,i) + \sum_{i \in S_x(y,i)} \{-\ln(\sqrt{2\pi}\,\sigma(i,j))\} - \quad (14)$$

$$\frac{[d_x(i,j,y) - d_{ox}(i,j)]^2}{2\sigma^2(i,j)} -$$

$$[d_x(i,j,y) - 1] a_{ii}^x(j)\} 1 \le y \le Y, 1 \le j \le N_y(j)$$

$$p_y = \delta(Y, N_y) + \quad (15)$$

$$\sum_{j \in S_y} \left\{ -\ln(\sqrt{2\pi}\,\sigma(j)) - \frac{[d_y(j) - d_{oy}(j)]^2}{2\sigma^2(j)} - [d_y(j) - 1] a_{ij}^y \right\}$$

where X is the number of pixels in each row, x is the horizontal coordinate of a pixel, Y is the number of rows, y is the vertical coordinate of a pixel, $N_x$ is the number of horizontal states in a given superstate, i identifies a state, $N_y$ is the number of superstates, j identifies a superstate, $a_{ii}$ is the self-transition probability for a state, d is the observed state duration in pixels, $d_0$ is the mean state duration in pixels, $\sigma$ is the standard deviation for state duration, $S_x$ is the sequence of states passed through in a superstate and $S_y$ is the sequence of superstates passed through.

Equation 14 represents the adjustment that would be made during postprocessing step 317. In equation (14), $p_x(y,j)$ is the adjusted log likelihood function in which self-transition probabilities have been replaced by Gaussian state-duration densities. Since states can be skipped, the number of states in $S_x(y,j)$ can be less than $N_x(j)$. Equation 15 represents the adjustment that would be made during postprocessing step 308. In equation (15), $p_y$ is the adjusted log likelihood function in which self-transition probabilities have been replaced by Gaussian superstate-duration densities. Again, since superstates can be skipped, the number of superstates in $S_y$ can be less than $N_y$.

Pseudo two-dimensional HMMs also lend themselves to applications in which it is necessary to compensate for size differences, translations or slants between an unknown text element and models with which such text element is compared. While the HMMs described above allow some flexibility in the size of the recognized text element, they are not truly size-independent. One approach that can be taken to cope with variability in size is to use multiple HMMs representing different sizes of each text element. Unfortunately, the use of multiple HMMs increases search time significantly because the Viterbi algorithm must be used, as described above, for each HMM. However, in accordance with the invention, a more general approach can be taken in which a single HMM is adjusted by a scaling parameter calculated to maximize the log likelihood. The scaling parameter is determined from the actual state durations and mean state durations as will be described. As will also be described, translation and slant parameters can be applied in a similar manner.

Such scaling, translation and slant parameters are preferably applied in two stages in a manner similar to which the state-duration densities are adjusted as described above. That is, such parameters relating to state probability calculations are applied as part of optional postprocessing step 317 and such factors relating to superstate probability calculations are applied as part of optional postprocessing step 308. Such two-stage application improves the superstate segmentation because the probabilities on which such superstate segmentation is based are then more accurately represented. As will be seen from the following explanations of the scaling, translation and slant parameters, a still more accurate final probability can be achieved by means of a second postprocessing step as part of step 308.

In addition to improving the accuracy of the likelihoods calculated by the methods of the invention, the scaling, translation and slant parameters obtained by the methods to be described can be useful for other purposes. For example, in an application in which text is being optically scanned and recognized for the purpose of being reset in type to obtain clearly readable copies, the scaling and slant parameters obtained for characters scanned can be used to specify the size and kind of font for such typesetting.

The scaling parameter to be applied to the final state probability in step 317 can be calculated as follows:

$$\lambda_x(y,j) = \frac{\alpha_x(y,j)}{\beta_x(y,j)} \quad (16)$$

where:

$$\alpha_x(y,j) = \sum_{i=1}^{N_x(j)} \frac{d_x(i,j,y) d_{ox}(i,j)}{\sigma^2(i,j)} \quad (17)$$

$$\beta_x(y,j) = \sum_{i=1}^{N_x(j)} \frac{d_x(i,j,y)^2}{\sigma^2(i,j)} \quad (18)$$

Equation (14) is modified as follows to incorporate such scaling parameter:

$$p_x(y,j) = P_x(y,j) + \sum_{i \in S_x(y,j)} \left\{ -\ln(\sqrt{2\pi}\ \sigma(i,j)) - \frac{[\lambda_x(y,j)d_x(i,j,y) - d_{ox}(i,j)]^2}{2\sigma^2(i,j)} - [d_x(i,j,y) - 1]\alpha_x^{xj}(j) \right\} \quad (19)$$

$$1 \leq y \leq Y, \quad 1 \leq j \leq N_y(j)$$

After the superstate segmentation is complete, the overall scaling parameter to be applied to the final superstate probability as part of step 308 can be calculated as follows:

$$\lambda = \alpha/\beta \quad (20)$$

where $$\alpha = \sum_{y=1}^{Y} \sum_{i=1}^{N_x(j)} \frac{d_x(i,j_s,y)d_{ox}(i,j_s)}{\sigma^2(i,j_s)} + \sum_{j=1}^{N_y} \frac{d_y(j)d_{oy}(j)}{\sigma^2(j)} \quad (21)$$

$$\beta = \sum_{y=1}^{Y} \sum_{i=1}^{N_x(j)} \frac{d_x^2(i,j_s,y)}{\sigma^2(i,j_s)} + \sum_{j=1}^{N_y} \frac{d_y^2(j)}{\sigma^2(j)} \quad (22)$$

Equation (15) is modified as follows to incorporate such overall scaling parameter:

$$p_y = \delta(Y,N_y) + \sum_{j \in S_y} \left\{ -\ln(\sqrt{2\pi}\ \sigma(j)) - \frac{[\lambda d_y(j) - d_{oy}(j)]^2}{2\sigma^2(j)} - [d_y(j) - 1]\alpha_{yj}^y \right\} \quad (23)$$

Thus, equations (19) and (23) achieve both state-duration density replacement and scaling compensation.

In equations (21) and (22), $j_s$ is a simplified notation indicating the superstate j associated with row y for the best path. For example, $d_x(1,3,8)$ means the duration of state 1 of superstate 3 for row 8, where the probability for row 8 calculated during step 305 was highest for superstate 3.

The values $\lambda_x(y,j)$ given by equation (16) are the best estimates of the scaling parameter that can be obtained with the information available at the time step 317 is performed. However, $\lambda$ given by equation (20) is a more accurate estimate. Therefore, performance can be improved if a second postprocessing step is added during step 308. To be able to perform this step, it is necessary to save in memory the values of $\lambda_x(y,j)$ and $d_x(i,y,j)$. The improved probability $p'_y$ is given by:

$$p'_y = p_y + \sum_{y=1}^{Y} \frac{[\lambda_x(y,j_s)d_x(i,j_s,y) - d_{ox}(i,j_s)]^2}{2\sigma^2(i,j_s)} - \sum_{y=1}^{Y} \frac{[\lambda d_x(i,j_s,y) - d_{ox}(i,j_s)]^2}{2\sigma^2(i,j_s)} \quad (24)$$

As can be seen, equation (24) substitutes the overall scaling $\lambda$ for the preliminary scaling parameters $\lambda_x$.

The above scaling procedure fails when the scaling parameters are either too large or too small as a result of an incorrect segmentation. A given HMM will typically produce the correct segmentation within a scaling range of approximately 4:1; therefore its is possible to cover a large range with a few models. For example, three models will cover a range of 64:1, which is usually sufficient for typical documents.

A procedure similar to that described above for scaling can be applied to compensate for translations wherein a text element is displaced in the x and/or the y direction from the position in which such text element is expected. The horizontal translation parameter to be applied in step 317 is given by:

$$t_x(y,j) = d_x(1,j,y) - d_{ox}(1,j) \quad (25)$$

Equation (14) is modified as follows to incorporate such translation parameter:

$$p_x(y,j) = P_x(y,j) + \quad (26)$$

$$\sum_{i \in S_x(y,j)} \{-\ln(\sqrt{2\pi}\ \sigma(i,j)) - [d_x(i,j,y) - 1]\alpha_{ij}^x\} -$$

$$\sum_{\substack{i \in S_x(i,j) \\ i \neq 1}} \frac{[d_x(i,j,y) - d_{ox}(i,j)]^2}{2\sigma^2(i,j)}$$

The vertical translation parameter to be applied in step 308 is given by:

$$t_y = d_y(1) - d_{oy}(1) \quad (27)$$

Equation (15) is modified as follows to incorporate such translation parameter:

$$p_y = \delta(Y, N_y) + \quad (28)$$

$$\sum_{j \in S_y} \{-\ln(\sqrt{2\pi}\ \sigma(j)) - [d_y(j) - 1]\alpha_{jj}^y\} -$$

$$\sum_{\substack{j \in S_y \\ j \neq 1}} \frac{[d_y(j) - d_{oy}(j)]^2}{2\sigma^2(j)}$$

Thus, equations (26) and (28) achieve both state-duration density replacement and translation compensation.

Again, the values of $t_x(y,j)$ are the best estimates of the horizontal translation parameter obtainable at the time step 317 is performed, and a more accurate probability can be achieved by performing a second postprocessing step during step 308 by evaluating:

$$t_x = \frac{\sum_{y=1}^{Y} \left[ \frac{d_x(1,j,y) - d_{ox}(1,j_s)}{\sigma^2(1,j_s)} \right]}{\sum_{y=1}^{Y} \left[ \frac{1}{\sigma^2(1,j_s)} \right]} \quad (29)$$

and then finding $p'_y$ as follows:

$$p'_y = p_y + \sum_{y=1}^{Y} \frac{[d_x(1,j_s,y) - t_x(y,j_s) - d_{ox}(1,j_s)]^2}{2\sigma^2(1,j_s)} -$$

$$\sum_{y=1}^{Y} \frac{[d_x(1,j_s,y) - t_x - d_{ox}(1,j_s)]^2}{2\sigma^2(1,j_s)} \quad (30)$$

Finally, slant parameters can be applied to compensate for text elements that are slanted to some degree. The slant parameter to be applied in step 317 can be calculated by:

$$m(y,j) = \frac{\gamma(y,j)}{\eta(y,j)} \quad (31)$$

where $$\gamma(y,j) = \frac{(Y-y)[d_x(1,j,y) - d_{ox}(1,j)]}{\sigma^2(1,j)} + \frac{y[d_x(N_x,j,y) - d_{ox}(N_x,j)]}{\sigma^2(N_x,j)} \quad (32)$$

$$\eta(y,j) = \frac{(Y-y)^2}{\sigma^2(1,j)} + \frac{y^2}{\sigma^2(N_x,j)} \quad (33)$$

Equation (14) is modified as follows to incorporate such slant parameter:

$$p_x(y,j) = P_x(y,j) + \quad (34)$$

$$\sum_{i \in S_x(y,j)} \{-\ln(\sqrt{2\pi}\ \sigma(i,j)) - [d_x(i,j,y) - 1]\alpha_{ij}^x\} -$$

$$\sum_{\substack{i \in S_x(y,j) \\ i \neq 1 \\ i \neq N_x}} \left\{ \frac{[d_x(i,j,y) - d_{ox}(i,j)]^2}{2\sigma^2(i,j)} \right\} -$$

$$\frac{[d_x(1,j,y) - d_{ox}(1,j) - m(y,j)(Y-y)]^2}{2\sigma^2(1,j)} -$$

$$\frac{[d_x(N_x,j,y) - d_{ox}(N_x,j) - ym(y,j)]^2}{2\sigma^2(N_x,j)}$$

The slant parameter to be calculated in step 308 is given by:

$$m = \frac{\gamma}{\eta} \quad (35)$$

where:

$$\gamma = \sum_{y=1}^{Y} \frac{(Y-y)[d_x(1,j_s,y) - d_{ox}(1,j_s)]}{\sigma^2(1,j_s)} + \quad (36)$$

$$\sum_{y=1}^{Y} \frac{y[d_x(N_x,j_s,y) - d_{ox}(N_x,j_s)]}{\sigma^2(N_x,j_s)}$$

and:

$$\eta = \sum_{y=1}^{Y} \left\{ \frac{(Y-y)^2}{\sigma^2(1,j_s)} + \frac{y^2}{\sigma^2(N_x,j_s)} \right\} \quad (37)$$

The slant parameter m is the tangent of the slant angle. In this case, there is no modification to equation (15) for step 308.

Again, a second postprocessing step can refine the accuracy of probability $p_y$. The values of $m(y,j)$ are the best estimates obtainable during step 317; however m is more accurate since it is based on all the information available during step 308. As was the case for scaling and translations, it is necessary to save the values of $m(y,j), d_x(1,j,y)$ and $d_x(N_x,j,y)$. The modified value $p'_y$ is then given by:

$$p'_y = p_y + \sum_{y=1}^{Y} \frac{[d_x(1,j_s,y) - d_{ox}(1,j_s) - m(y,j_s)(Y-y)]^2}{2\sigma^2(1,j_s)} + \quad (38)$$

$$\sum_{y=1}^{Y} \frac{[d_x(N_x,j_s,y) - d_{ox}(N_x,j_s) - m(y,j_s)y]^2}{2\sigma^2(N_x,j_s)} -$$

$$\sum_{y=1}^{Y} \frac{[d_x(1,j_s,y) - d_{ox}(1,j_s) - m(Y-y)]^2}{2\sigma^2(1,j_s)} -$$

$$\sum_{y=1}^{Y} \frac{[d_x(N_x,j_s,y) - d_{ox}(N_x,j_s) - my]^2}{2\sigma^2(N_x,j_s)}$$

The case of rotation is slightly more involved because pseudo two-dimensional HMMs are not rotationally invariant and the segmentation of a rotated text element will not be correct. However, for the case of small angles, (for example <30°, it is possible to treat a rotation as a combination of two successive slant transformations in the vertical and horizontal directions, respectively. This approach requires two HMMs for each text element: one in which superstates represent horizontal slices of the text element and another in which superstates represent vertical slices. Initially, each HMM is scored using the steps of FIG. 2 with the scores adjusted by slant parameters in postprocessing steps 317 and 308 using equation (34) (and possibly equation (38)) and the HMM having the best score (highest value of $P_y$) is chosen. The pixel map is then deslanted by the angle (arctan m) found for the chosen HMM. Such deslanting can be accomplished by shifting pixels appropriately: in rows if the chosen HMM has superstates representing horizontal slices or in columns if the chosen HMM has superstates representing vertical slices. Then the other HMM is evaluated again on the deslanted pixel map with the score again adjusted by the slant parameter to obtain the final score.

It will be clear from the above explanation of the invention that a library or alphabet of pseudo two-dimensional HMMs can be created, each such HMM representing a different known text element, that observation vectors for unknown text elements can be compared with such HMMs using the Viterbi algorithm and adjustments as described above and that the HMM for which the highest score is calculated can then be said to represent the unknown text element, thus identifying such unknown text element.

Figure 4:
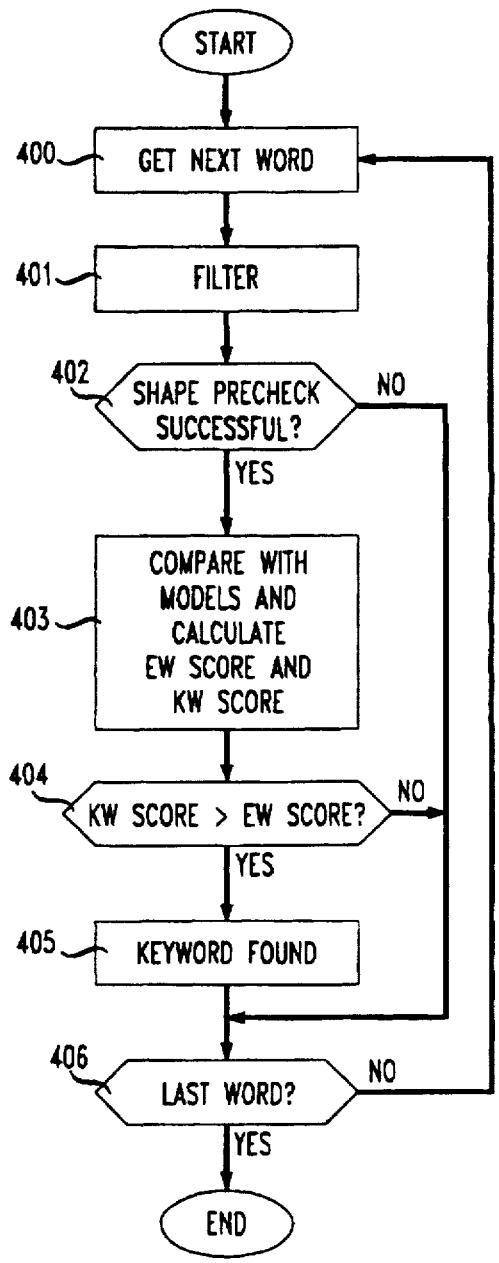
FIG. 4 is a flow chart showing the procedure for spotting keywords in accordance with the invention.

Pseudo two-dimensional HMMs can be used to great advantage, in accordance with the invention, to recognize keywords embedded in poorly printed or reproduced text. There are many applications in which the need arises to determine whether a particular word is present, for example, spotting a city or state name on an envelope. FIG. 4 is a flow chart showing the use of the method of the invention to recognize a keyword in text.

Again, the assumption is made that the text has been scanned and that an unknown word to be recognized has been captured as a sequence of pixels generated by a conventional raster scan of the word. However, characters forming the word may be badly degraded and connected.

An unknown word to be analyzed is entered (step 400) and preprocessed by a nonlinear filter to reduce noise while retaining character sharpness and connectivity (step 401). Such filtering is described in application Ser. No. 07/813/225 mentioned above. The unknown word is then prechecked against known characteristics of the keyword to eliminate words unlikely to be the keyword (step 402). This operation can be performed by comparing distinctive word shapes for both the unknown word and the keyword, for example, word width, ratio of width to height and numbers of ascenders and descenders. Because training routines as described above will be used to generate pseudo two-dimensional HMMs for recognizing keywords, as will be explained, such training routines can also be used to obtain the required information about word shapes. Thresholds can be set with a tolerance, say ±20%, to allow for variation. For example, if the width of the keyword in the training set is between 20 and 30 pixels, then any unknown word with a width smaller than 16 pixels or larger than 36 pixels will be considered as an extraneous word. Prechecking narrows the recognition procedure to a small subset of the total search space.

An unknown word that passes the prechecking step is then compared against two pseudo two-dimensional HMMs using the Viterbi algorithm as described above in the explanation of FIG. 2. One of the MMs is for the keyword; the other is for all extraneous words, that is, words that can pass the prechecking step but are not the keyword. By means of such comparisons, two scores are calculated for the unknown word: one with respect to the keyword (KW score), the other with respect to all extraneous words (EW score)(step 403). The unknown word is considered a keyword if the KW score is higher than the EW score (step 405). Such procedure is repeated until all the keywords are found (step 406).

To optimize the operation of the invention for recognizing keywords, it has been found useful to create a four-component observation vector for each pixel. The first component is the pixel value itself, representing instantaneous information. Thus, the value of such first component can be 0 or 1. The second component is derived from three adjacent pixels along the same row, centered on the current pixel, representing transitional information. The value of the second component is determined by considering such three pixels to be a binary number; thus, such value can range from 0 to 7. The third and fourth components are chosen to include global information about a pixel; that is, the relative position of the pixel in its row and column, respectively. The value of the third component is obtained by dividing the pixel location in the row by the length of the row and quantizing it into one of ten uniform levels, thus, such value can range from 0 to 9. The lengths of rows can be different, as the starting and ending points of a row for the purpose of observation vectors are defined as the first and last black pixels, respectively. The value of the fourth component is obtained similarly by the length of the column, again resulting in a range from 0 to 9. All columns are specified as being the same height. Many other ways of specifying the elements of observation vectors are possible, the ones described have been found suitable for the keyword recognition problem.

For simplicity, it is assumed that the four components of the observation vector are statistically uncorrelated. Accordingly, the probability of occurrence $b_i$ of a particular observation vector O in state i can be expressed as the product of the probabilities of occurrence of each of the components m in the observation vector in such state. Thus:

$$b_i(O) = \prod_{m=1}^{m=4} b_{im}[O(m)] \tag{39}$$

During the training procedure, a histogram is kept for each component, and the estimates of the parameters $b_{im}(p)$ are given by the number of vectors in state $S_i$ having observation p in the mth component divided by the number of vectors in state $S_i$.

The pseudo two-dimensional HMMs used to represent the keyword and the extraneous words are formed with a number of superstates in the vertical direction, each superstate having a number of states in the horizontal direction. The HMM for the keyword is determined by the topology of the word. Again, the transitions allowed are limited to right-to-left and top-down, with skipping one state or skipping one superstate allowed to cover cases in which words are badly deformed.

The parameters for the keyword HMM and the extraneous word HMM are estimated in a training procedure using the segmental k-means algorithm described above in conjunction with FIG. 3. The keyword HMM and the extraneous-word HMM are trained with tokens representing the keyword and extraneous words, respectively.

The method of identifying keywords in accordance with the invention has been evaluated on a computer simulated data base. In order to form a difficult test data base for spotting keywords, the word "node" was chosen as the keyword and a set of four-letter extraneous words, some being arbitrary letter combinations, having a similar shape to that of "node" was selected; for example, "abed," "cook," "fume," "iamb," "mina" and "alum." Such words could all pass prechecking step 402 in FIG. 4. Various clean examples of all these words were prepared using different point sizes and typefaces, including slanted versions. Then degraded examples were prepared by convolving clean examples with two-dimensional Gaussian functions and introducing random noise. Different sets of examples were prepared with different degrees of degrading. Parameters for the keyword HMM were generated by the method shown in FIG. 3 using clean and somewhat degraded versions of the keyword as training tokens. Parameters for the extraneous word HMM were generated similarly using clean and somewhat degraded versions of the extraneous words as training tokens. The more degraded versions of the keyword and extraneous words were used in testing the method. Three different testing sets I, II and III were created; testing sets II and III included words with different sizes and higher degradation and testing set III included slanted words.

The performance of the pseudo two-dimensional HMM of the invention was compared with that of a one-dimensional HMM. Table I shows the sizes of the training and testing sets and the recognition accuracy of the one-dimensional and pseudo two-dimensional HMMs.

| Set | Keywords | Extraneous Words | 1-D HMM | 2-D HMM |
| --- | --- | --- | --- | --- |
| Training | 100 | 240 | | |
| Test I | 345 | 2000 | 97% | 99% |
| Test II | 1325 | 8000 | 70% | 96% |
| Test III | 2650 | 16000 | — | 94% |

As can be seen, the pseudo two-dimensional HMM performs much better in terms of size- and slant-independence. For testing set II, which contained words with different sizes, size normalization was used for the one-dimensional approach, which resulted in distortion of the data and the poorer performance. The one-dimensional approach was not used with testing set III, which contained slanted words, however, worse performance for such approach can be expected because of the need to add a slant correction step. However, size normalization and slant correction are not required for the pseudo two-dimensional approach because of the "elastic matching" property of pseudo two-dimensional HMMs.

The use of the four-component observation vector for keyword recognition using pseudo two-dimensional HMMs contributes to the robustness of the method for words of varying sizes and slant without the need for the post-processing steps described above in which different probability densities, scaling parameters and slant parameters were introduced. However, various combinations of all these methods may be useful for different applications.

The invention has been shown and described with reference to particular embodiments. However, it will be understood by those skilled in the art that various changes may be made therein without departing from the spirit and scope of the invention.

We claim:

1. A method of using a computer to spot a keyword in a document, which comprises the steps of:

storing first signals representing a first pseudo two-dimensional hidden Markov model in said computer, said first pseudo two-dimensional hidden Markov model representing said keyword and including a one-dimensional hidden Markov model having at least one superstate associated with a first dimension of said keyword and, for each superstate, a one-dimensional hidden Markov model having at least one state associated with a second dimension of said keyword, storing second signals representing a second pseudo two-dimensional hidden Markov model in said computer, said second pseudo two-dimensional hidden Markov model representing a plurality of extraneous words, other than said keyword, that may appear in said text and including a one-dimensional hidden Markov model having at least one superstate associated with a first dimension of said plurality of extraneous words and, for each superstate, a one dimensional hidden Markov model having at least one state associated with a second dimension of said plurality of extraneous words, scanning said document to generate third signals representing a pixel map for each text word in said document, said pixel map having rows and columns of pixels, for each text word:

responsive to said third signals, comparing the pixel map for said text word with said first pseudo two-dimensional hidden Markov model, by applying the Viterbi algorithm, to generate a first comparison signal indicating a first probability that said first pseudo two-dimensional hidden Markov model represents said text word, also responsive to said third signals, comparing the pixel map for said text word with said second pseudo two-dimensional hidden Markov model, by applying the Viterbi algorithm, to generate a second comparison signal indicating a second probability that said second pseudo two-dimensional hidden Markov model represents said text word, and responsive to said first and second comparison signals, generating an output signal identifying said text word as said keyword if said first probability is greater than said second probability.

2. The method of claim 1 wherein the step of creating said first pseudo two-dimensional hidden Markov model comprises the step of:

estimating the parameters for said first pseudo two-dimensional hidden Markov model from a plurality of training tokens representing said keyword by applying the segmental k-means training procedure, and wherein the step of creating said second pseudo two-dimensional hidden Markov model comprises the step of:

estimating the parameters for said second pseudo two-dimensional hidden Markov model from a plurality of training tokens representing said extraneous words by applying the segmental k-means training procedure.

3. The method of claim 1 wherein said superstates represent substantially horizontal slices through said keyword and each comparing step comprises the steps of:

in a first routine, for each combination of one of said rows in said pixel map and one of said superstates, applying the Viterbi algorithm to determine a best path for said one row through the states in said one superstate and a probability for the final state in said one superstate and in a second routine, applying the Viterbi algorithm and the probabilities determined in said first routine to determine a best path through all said superstates and a probability for the final superstate.

4. The method of claim 1 which comprises the further steps of:

during the creation of said first pseudo two-dimensional hidden Markov model, establishing keyword shape characteristics, before said comparing step, prechecking said text word against said keyword shape characteristics, and eliminating text words not having substantially said keyword shape characteristics.

5. A method of using a computer to identify unknown text elements in a document, which comprises the steps of:

storing first signals representing a plurality of pseudo two-dimensional hidden Markov models in said computer, each pseudo two-dimensional hidden Markov model having at least one superstate associated with a first dimension of said known text element and, for each superstate, a one-dimensional hidden Markov model having at least one state associated with a second dimension of said known text element, scanning said document to generates second signals representing a pixel map for each unknown text element, said pixel map having rows and columns of pixels, and for each unknown text element:

responsive to said second signals, comparing said pixel map for said unknown text element with each pseudo two-dimensional hidden Markov model, by applying the Viterbi algorithm, to generate a comparison signal indicating the probability that said pseudo two-dimensional hidden Markov model represents said unknown text element, and responsive to said comparision signals, generating an output signal identifying said unknown text element as the known text element represented by the pseudo two-dimensional hidden Markov model for which said probability is highest.

6. The method of claim 5 wherein the step of creating pseudo two-dimensional hidden Markov models comprises:

estimating the parameters for the pseudo two-dimensional hidden Markov model for each known text element from a plurality of training tokens representing said known text element by applying the segmental k-means training procedure.

7. The method of claim 5 wherein said superstates represent substantially horizontal slices through the text elements represented by said pseudo two-dimensional hidden Markov models and each comparing step comprises the steps of:

in a first routine, for each combination of one of said rows in said pixel map and one of said superstates, applying the Viterbi algorithm to determine a best path for said one row through the states in said one superstate and a probability for the final state in said one superstate and in a second routine, applying the Viterbi algorithm and the probabilities determined in said first routine to determine a best path through all said superstates and a probability for the final superstate.

8. The method of claim 5 wherein said superstates represent substantially vertical slices through the text elements represented by said pseudo two-dimensional hidden Markov models and each comparing step comprises the steps of:

in a first routine, for each combination of one of said columns in said pixel map and one of said superstates, applying the Viterbi algorithm to determine a best path for said one column through the states in said one superstate and a probability for the final state in said one superstate and in a second routine, applying the Viterbi algorithm and the probabilities determined in said first routine to determine a best path through all said superstates and a probability for the final superstate.

9. The method of claim 7 or claim 8 wherein each said pseudo two-dimensional hidden Markov model includes self-transition probabilities for the states and superstates in said model, which further comprises:

in said model-creating step, estimating a mean duration and a standard deviation for each state and superstate in said pseudo two-dimensional hidden Markov model, in said first and second routines, maintaining a record of the best path through said states and superstates, and wherein said comparing step further comprises:

adjusting said determined probability by replacing duration densities based on said self-transition probabilities with duration densities based on the relevant mean durations and standard deviations for each state and superstate along said best path.

10. The method of claim 9 wherein said adjusting step further comprises:

during said first routine, adjusting the probability for the final state in each superstate by replacing duration densities based on self-transition probabilities with duration densities based on the relevant mean durations and standard deviations for the states in said superstate along the best path, and during said second routine, adjusting the probability for the final superstate by replacing duration densities based on self-transition probabilities with duration densities based on the relevant mean durations and standard deviations for each superstate.

11. The method of claim 9 which further comprises:

before said adjusting step, calculating at least one adjustment parameter relating to at least one difference between said unknown text element and the known text element represented by said pseudo two-dimensional hidden Markov model, and incorporating said at least one adjustment parameter in said adjusting step.

12. The method of claim 11 wherein at least one of said adjustment parameters is a scaling parameter relating the size of said unknown text element to the size of the known text element represented by said pseudo two-dimensional hidden Markov model.

13. The method of claim 8 wherein at least one of said adjustment parameters is a translation parameter relating to displacement of said unknown text element with respect to the position of the known text element represented by said pseudo two-dimensional hidden Markov model.

14. The method of claim 8 wherein at least one of said adjustment parameters is a slant parameter relating to the slant angle of said unknown text element with respect to the known text element represented by said pseudo two-dimensional hidden Markov model.

15. The method of claim 14 wherein said unknown text element may be rotated with respect to said known text elements, said creating step comprises, for each known text element, creating a first one of said pseudo two-dimensional hidden Markov models having superstate representing substantially horizontal slices and a second one of said pseudo two-dimensional hidden Markov models having superstates representing substantially vertical slices and said comparing, calculating, incorporating and adjusting steps are repeated for said unknown text element to obtain a slant parameter and an adjusted probability for both said first and said second pseudo two-dimensional hidden Markov models, which further comprises:

selecting the one of said first and second pseudo two-dimensional hidden Markov models having the highest adjusted probability.

deslanting the source image of the unknown text element through the angle represented by the slant parameter for said selected psuedo two-dimensional hidden Markov model, repeating said comparing, calculating, incorporating and adjusting steps using said deslanted source image and the model not selected to determine a new probability for said unknown text element adjusted for said rotation.

16. The method of claim 9, which further comprises:

during said first routine, calculating at least one preliminary adjustment parameter relating to at least one difference between said unknown text element and the known text element represented by said pseudo two-dimensional hidden Markov model, adjusting the probability for the final state in each superstate by replacing duration densities based on self-transition probabilities with duration densities based on the relevant mean durations and standard deviations for the states along the best path in said superstate and incorporating said at least one preliminary adjustment parameter, during said second routine, calculating at least one overall adjustment parameter relating to said at least one difference, adjusting the probability for the final superstate by replacing duration densities based on self-transition probabilities with duration densities based on the relevant mean durations and standard deviations for said superstates and incorporating said at least one adjustment parameter.

17. The method of claim 16, which further comprises:

after said second routine, readjusting said adjusted probability by substituting said overall adjustment parameter for each preliminary adjustment parameter.

* * * * *